No. 803,686. PATENTED NOV. 7, 1905.
G. W. FURBECK & A. N. CARVER.
FLUID PRESSURE CONTROLLER.
APPLICATION FILED MAR. 10, 1900.
4 SHEETS—SHEET 2.
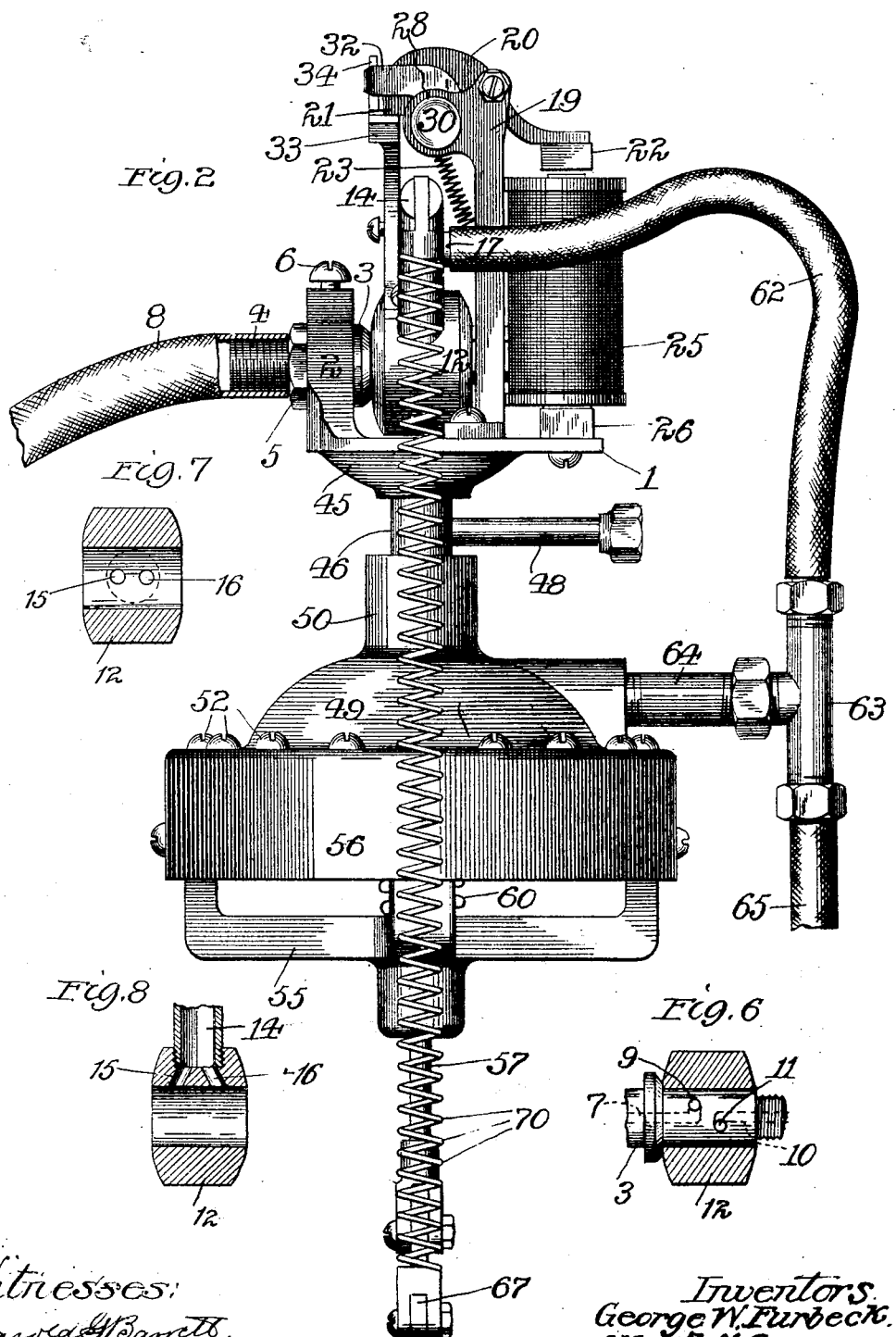
Witnesses:
Harold G. Barrett.
Geo. R. Harbaugh.
Inventors.
George W. Furbeck.
Albert N. Carver.
By Coburn, Thacher & McEwen, Attys.

No. 803,686. PATENTED NOV. 7, 1905.
G. W. FURBECK & A. N. CARVER.
FLUID PRESSURE CONTROLLER.
APPLICATION FILED MAR. 10, 1900.
4 SHEETS—SHEET 3.
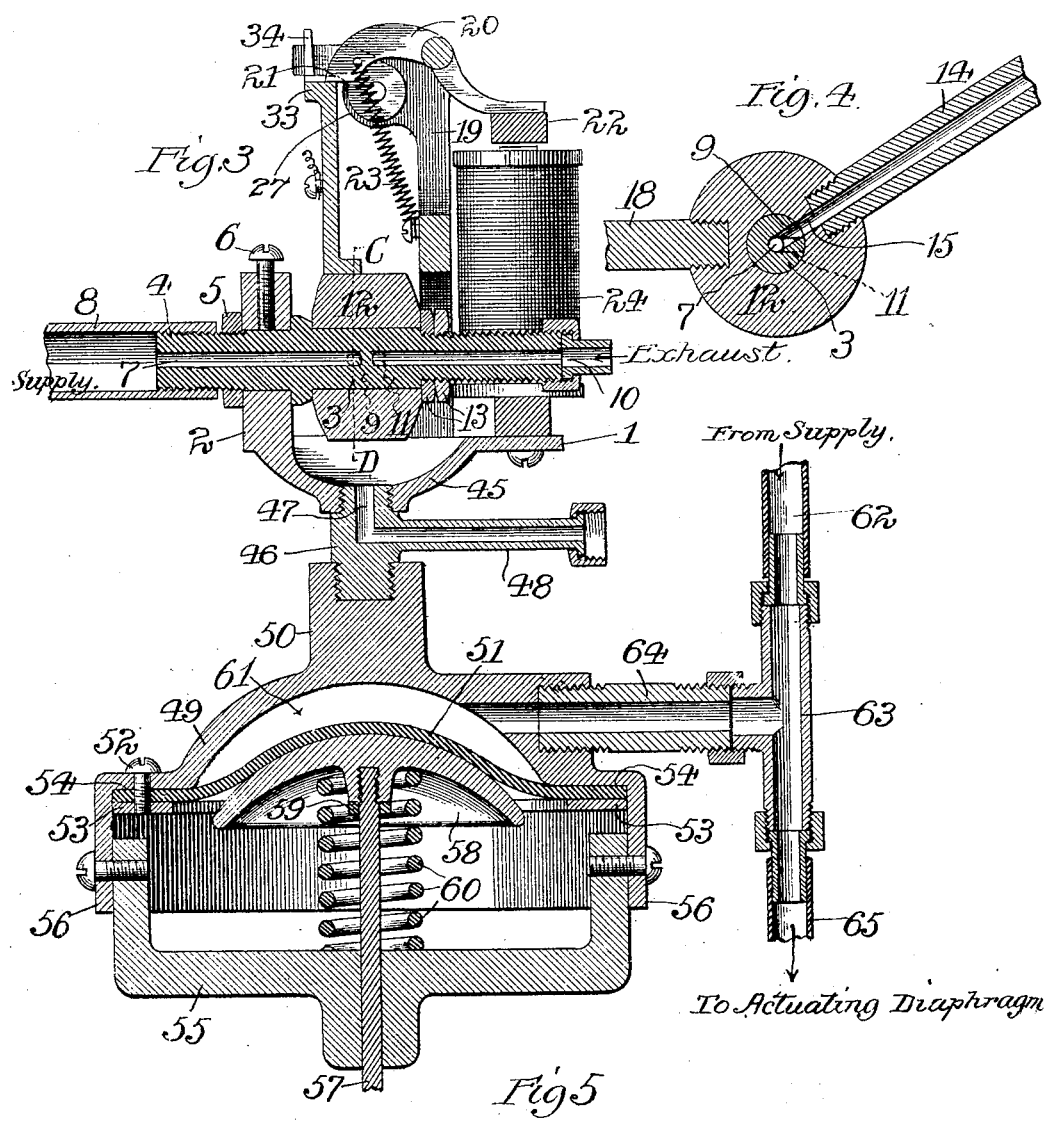
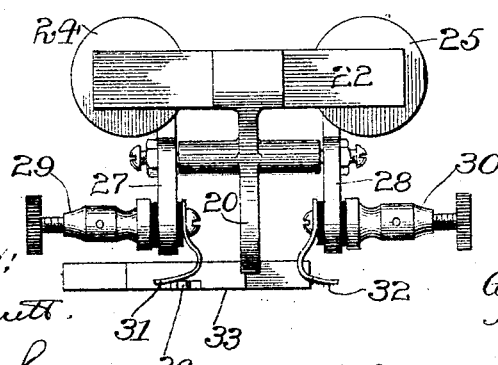
Witnesses:
Harold J. Barritt.
George R. Harbaugh.
Inventors:
George W. Furbeck,
Albert N. Carver.
By Coburn, Hibben & McElroy Attys.

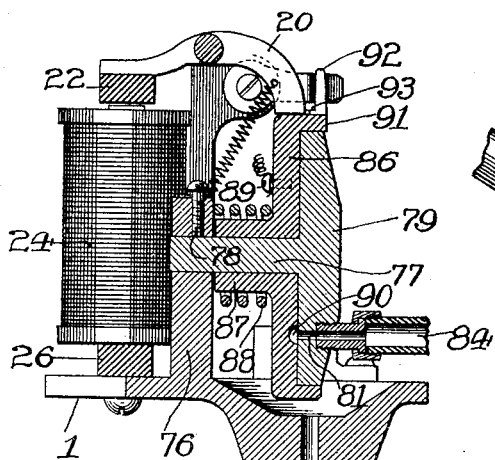
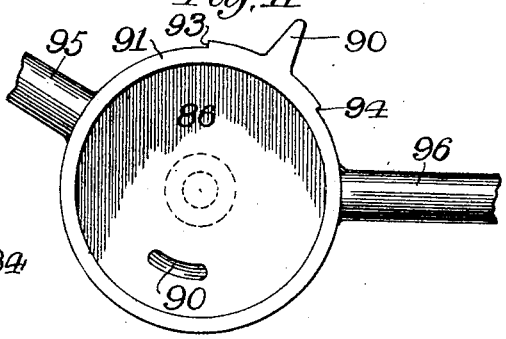
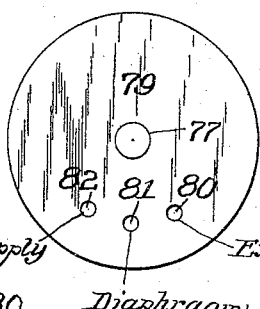
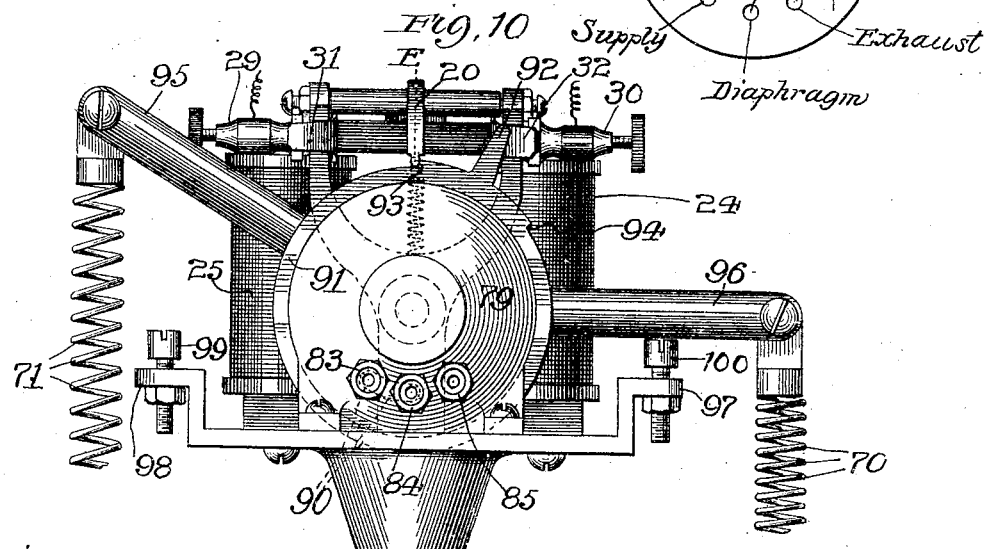

UNITED STATES PATENT OFFICE.

GEORGE W. FURBECK AND ALBERT N. CARVER, OF CHICAGO, ILLINOIS.

FLUID-PRESSURE CONTROLLER.

No. 803,686.   Specification of Letters Patent.   Patented Nov. 7, 1905.

Application filed March 10, 1900. Serial No. 8,171.

*To all whom it may concern:*

Be it known that we, GEORGE W. FURBECK and ALBERT N. CARVER, of Chicago, in the county of Cook and State of Illinois, have invented a certain new and useful Fluid-Pressure Controller, of which the following is a specification.

Our invention has for its object the regulation of fluid-pressure to any fluid-pressure-actuated device, and as one instance of many uses to which it may be put it may be employed to control the temperature of any body or fluid, such as air or any liquid, whereby a uniform temperature may be maintained therein. Various methods or devices are employed to change the temperature—such as opening or closing dampers of all kinds, regulating the supply of fuel in any way, regulating the supply of air, governing the supply of steam, water, or other fluid used for heating purposes, &c.—and such devices are generally actuated by a movable abutment which in some heating systems is exposed to pressure when the heat is on and in other systems or constructions is unexposed to pressure in such case. To provide suitable and reliable means for controlling pressure to any fluid-pressure-actuated mechanism—such as, for one instance, against said movable abutment of a thermostatic system—is the object of our invention, which is not therefore limited to any particular application, location, or use, but is intended, broadly, as an automatic fluid-pressure regulator for any purpose desired.

Our apparatus contains many novel and advantageous features of construction and operation, which will be apparent from the description hereinafter given.

In the drawings, Figure 1 is a front elevation of our device; Fig. 2, a side elevation thereof; Fig. 3, a sectional elevation on line A B of Fig. 1; Fig. 4, a section on line C D of Fig. 3; Fig. 5, a plan of the switch and electromagnets; Figs. 6 to 8, detail views of the valve; and Figs. 9 to 12, views of a modified form of construction, in which Fig. 9 is a section on line E F of Fig. 10; Fig. 10, an elevation of the device shown in Fig. 9; and Figs. 11 and 12, elevations of the valve and valve-seat, respectively.

In the practice of our invention we provide a plate or casting 1, having an upwardly-projecting extension or lug 2, through which passes a horizontal plug 3. The nozzle portion 4 of the plug may be screw-threaded and held in place and secured to the plate by means of a lock-nut 5. The plug may furthermore be held against rotation by a set-screw 6. The plug has a central bore or passage 7, communicating at the nozzle end with a service-pipe 8 for supplying any suitable fluid under pressure—such as, for instance, water or air. The supply-passage 7 opens into a lateral supply-port 9 in the plug 3. The plug is also provided with a centrally-located outlet or exhaust passage 10, which communicates with a lateral exhaust-port 11 adjacent the port 9.

The rotary valve proper (marked 12) is substantially cylindrical, with a central bore adapted to receive the plug and held in place with respect thereto by nuts 13 or in any other suitable way. An arm 14, having a central passage for a portion of its length, is secured to such valve-body, as shown in Fig. 4, and its passage communicates with the ports or passages 15 and 16, which register either with the port 9 or 11 in their different positions, as hereinafter described. As shown in Fig. 2, the passage in said arm terminates in a nozzle 17 laterally of the arm 14. An arm 18, unprovided with any passage, is also secured to the valve at an obtuse angle with respect to the other arm.

A suitable frame or support 19 is secured to the plate 1, although it is obvious that it may be formed integral therewith. In this frame is pivoted a lever 20, whose forward end 21 constitutes a catch and whose other end is provided with an armature 22, normally held away from the poles of a pair of electromagnets by any suitable means, such as the spring 23. This armature is controlled by a pair of electromagnets 24 and 25, suitably mounted on the plate 1 and having the usual pole-piece 26, connecting the poles of the magnets. Upon forward extensions or lugs 27 and 28 of the support 19 are arranged ordinary binding-posts 29 and 30, and to their inner ends are secured flexible or spring contacts 31 and 32, respectively, projecting in the path of a contact-finger about to be described.

Upon the valve is mounted in any suitable manner a quadrant 33, preferably though not necessarily constituting a separate piece from the valve itself and provided with a contact-finger 34, designed to contact either of the contacts 31 and 32 in its two positions, such mechanism forming a switch. The quadrant is also provided with two shoulders 35 and 36, engaged in either of the two positions by the catch 21, as will be hereinafter understood when the operation of the device is described.

The electrical connections or circuits may be run as follows: Commencing with the battery 37, the circuit extends through wire 38 to any ordinary thermostat 39, and assuming that the last connection in the thermostat was the "hot" contact (see Fig. 1) the circuit then extends through wire 40 to binding-post 29, to contact 31, through finger 34 and quadrant 33 to the binding-post 41 thereon, through wire 42, through the two coils, and thence through wire 43, back to battery. When the thermostat connection is on the "cold" contact, the circuit extends from battery, as before, to the thermostat, thence through wire 44 to binding-post 30, contact 32, through finger 34 of quadrant 33 when such quadrant is in its dotted-line position, thence by wire 42 through the coils and back again to battery. The running of the circuits as above outlined is illustrated in a diagrammatic way in Fig. 1. To adapt the device to those systems having pressure on a movable abutment when the heat is on, the connection of circuit-wires 40 and 44 may be reversed—that is, may be connected to the cold and hot contacts, respectively, of the thermostat 39.

The electrical devices above described actuate the catch mechanism which controls the movements of the quadrant; but it will be understood that such devices illustrate but one means for actuating that mechanism and that any device capable of performing the same functions may be adopted in lieu thereof.

The base-plate 1 is preferably dished to form a drip plate or cup 45, having an outlet into which is secured a connecting plug or stem 46, provided with a drip or drain passage 47, communicating with the cup and extending through a pipe 48, which may be connected to a waste-pipe. The object of such construction is to drain away any possible leakage from the valve above in case a liquid is used for pressure.

A casing 49, forming a diaphragm-casing, is preferably connected to such stem 46, the latter screwing into a projecting lug or boss 50 on the casing. This casing, which is substantially hemispherical, contains a movable abutment 51, which, as shown, is a diaphragm whose edges are clamped by means of screws 52 between an annular plate or ring 53 and the interior annular shoulder 54 in the casing. A spider 55 is secured to the downwardly-projecting flange 56 and provided with a central opening forming a guide for a reciprocating rod or plunger 57, preferably screw-threaded at its upper end and screwing into a convex disk 58, which presses against the diaphragm at all times and is actuated thereby. A spring 60, abutting at one end against the spider and at the other end against the disk, exerts its tension upward against pressure admitted to the diaphragm-chamber 61.

The movable abutment may be either a diaphragm or its equivalent, a piston, and the same constitutes what may be called a "motor-diaphragm."

As shown in Fig. 2, a flexible pipe or connection 62 is secured to the nozzle 17 at one end and to a T 63 at the other end. This T has a branch pipe or passage 64, entering the diaphragm-chamber 61, and a connection with a pipe, such as 65, leading to any fluid-pressure-actuated mechanism—as, for example, to an abutment or diaphragm (not shown)—which is common and well known for actuating the devices for causing in any way an increase or decrease of heat, whereby the proper predetermined temperature is maintained in anything, whether air or liquid.

To the end of the plunger 57 is secured a bifurcated piece 66, pivotally connected to a lever 67 by means of a screw-bolt 68. This lever is fulcrumed upon the fulcrum piece or rod 69, projecting downwardly from the spider. Between the outer end of arm 14 and one end of the lever 67 is arranged a spring 70, and a similar spring 71 is arranged between the outer end of arm 18 and the other end of lever 67. The above-described devices constitute one example of a tension mechanism that may be employed; but it is obvious that mechanical changes may be made and equivalents employed without departing from the spirit of our invention or intent and scope of our claims.

It is to be understood that any suitable means of attachment or support may be employed for the entire device above described, and as such means are varied and obvious they are not herein shown.

When the apparatus is in the position shown, it is ready to operate from cold to hot contact, supposing that the actuating-abutment is of that class which causes a supply of heat when the pressure is on and shuts off the heat when the pressure is off. In this position ports 9 and 15 register, so that the pressure is freely admitted to the motor-diaphragm chamber 61 and also to the usual actuating-diaphragm (not shown) through pipe 65. The pressure against diaphragm 51 has forced the rod 57 downward against the tension of the spring 70, whereupon the lever 67 assumes the position shown in full lines in Fig. 1. The quadrant at this time is locked by the catch mechanism into the position shown in full lines in the drawings, so that the effect of the described position of the lever 67 is to distend or elongate spring 70 to increase its tension and to relieve whatever tension may be on the spring 71. The tendency of the valve 12 is thus to partially rotate; but it is prevented by the engagement of the catch on the quadrant, and until such catch is released the parts will remain in such position. (Shown in full lines.)

When the predetermined temperature has been reached and the thermostat 39 has made connection with the hot contact, the circuit will be completed through the contact 31, and the catch mechanism will thereupon be actuated. The energizing of the magnets will cause the armature to be attracted and the catch 21 to be rocked upward against the tension of the spring 23, thereby releasing such catch from engagement with shoulder 36, whereupon spring 70 will partially rotate the entire valve, so as to cause registration of ports 11 and 16. The supply-port will now be closed, and the pressure against the motor-diaphragm and also the actuating-diaphragm (not shown) will then be depleted to permit the heat to be decreased in the many different ways already outlined herein through the regulation and control exercised by the mechanism described. The position of the arms, quadrant, and the lever in this changed position is shown in dotted lines in Fig. 1. At this time the switch contacts point or terminal 32, and the catch engaging behind shoulder 35 prevents the rocking of the valve to the left, Fig. 1, although the spring 71, owing to the separation of the attachment pieces of its ends, has been put under tension, while that of the spring 70 has been released.

When the temperature is lowered to the predetermined degree, the thermostat 39 makes contact with the cold contact, thereby establishing a circuit through contact-plate 32, whereupon the catch will be released and the spring 71 permitted to exert its tension by turning the valve to the position shown in full lines in Fig. 1. At this time the exhaust will be closed and pressure admitted through ports 9 and 15 to the motor-diaphragm and to the actuating-diaphragm, (not shown,) so that the generation or supply of heat may be increased.

It is well known that in a certain class of heating systems—such as in hot-air furnaces, steam and hot-water boilers—the heat is shut off when the pressure against the usual diaphragm is exhausted; but it is obvious that the invention may be used in connection with systems having a reverse action of the actuating-diaphragm by simply reversing the connections on the thermostat 39, as before referred to, or, as is also evident, changes may be made in lever connections coöperating with such diaphragm.

The above-described operations continue indefinitely in order that pressure may be automatically admitted and released in any fluid-pressure-actuated mechanism or in the construction herein shown in order that the temperature may be maintained at some predetermined degree. The device is always automatically set and ready for operation either in one direction or the other, and the time of movement is controlled by the thermostat device when the device is used in a thermostatic system.

The downward position of the arm 14 (represented in dotted lines in Fig. 1) is limited by the stop 72, which has a screw-bolt passing through the plate 1 and locked in adjusted position by a nut 73. The arm 18 is provided with a similar stop 74, having a nut 75. It is obvious that both of these stops may be adjusted to determine and limit the downward position of the arms, and consequently the amount of partial rotation of the valve.

In Figs. 9 to 12 is shown a modified form of construction of valve which may be more suitable for certain uses, and as the other parts may be similar to those before described they will be indicated by similar reference characters. Only the upper part of the device is shown, that portion below the broken line of Figs. 9 and 10 being the same as that shown in the preceding figures. In this modified form the valve is of the rotary-disk type instead of the plug-valve type. As shown, a frame 76, preferably, though not necessarily, integral with plate 1, forms a support for the stem of a valve, which is substantially T-shaped in longitudinal section, the stem 77 thereof entering such frame and held in place therein by a set-screw 78. The head 79 of the T is the seat proper, and near its lower margin it is provided with three transverse ports or passages 80, 81, and 82, which are respectively the "exhaust," "diaphragm," and "supply" ports and are so indicated in the drawings. The exhaust-passage of course leads to the atmosphere through a pipe 83—that is, in this case preferably to a waste-pipe. The diaphragm-passage leads through a pipe 84 to the motor-diaphragm and to the actuating-diaphragm, and the supply-passage communicates, through a pipe 85, with any service-pipe connected with any suitable source of supply. The valve comprises a disk portion 86, having a hub 87 surrounded by a coiled spring 88 to keep the valve closely upon its seat. A binding post or screw 89 may be provided on the valve, which forms part of circuits which are the same in all substantial respects as the circuits diagrammatically illustrated in Fig. 1 of the drawings. A recess 90 is formed in the face of the disk, and its function is to connect port 81 with either port 80 or 82, according as the valve is turned in one direction or the other. The disk is provided with an annular flange 91, embracing the valve-seat at its edge, such construction of disk forming a socket in which the seat fits snugly. Formed separate or integral with this rotary valve is a contact-finger 92, which forms the switch and is adapted to contact either the contact 31 or 32. The margin of the flange of this valve is provided with shoulders 93 and 94, against which the catch 21 is adapted to engage, according to the particular position of the valve. As shown in the drawings, the arms 95 and 96, which are unprovided with passages, are shown as integral with the valve, although such arms might, if desired, obviously be formed separate therefrom. Between the ends of these arms and the ends of a lever, such as lever 67, which is understood as forming a part of the modification, are springs similar to the springs 70 and 71, hereinbefore described, and are similarly indicated.

As shown more particularly in Fig. 10, the base-plate is formed with projections or shelves 97 and 98, through which extend screwbolts 99 and 100, respectively, which serve as stops for the arms 95 and 96 and are adjustable, so as to adjust the range of partial rotation of the valve.

The operation of the modified form of construction is as follows: The parts are represented in a position different from that of the first form shown in Fig. 1, and the same is ready to operate from the hot to the cold contact of the thermostat. The spring 71 in Fig. 10 has been extended, and thereby put under tension, while spring 70 is practically without tension. In this position the contact-finger 92 is on the contact 32, and the valve is under tension to rock to the left, (see Fig. 10,) but is prevented from so doing by reason of the engagement of the catch mechanism against the shoulder 93. At this time also the recess 90 connects ports 80 and 81, thereby exhausting the motor diaphragm-chamber and also the pressure in the pipe 65. (Shown in Figs. 2 and 3.) When, however, the temperature has decreased below the predetermined degree, the thermostat will make connection with the cold contact and the circuit will be completed, so that the coils will be energized to attract the armature and the catch mechanism thereby released from against the shoulder 93. The spring 71 will thereupon be free to exert its tension to shift or partially rotate the valve to the left, (see Fig. 10,) whereupon the contact-finger 92 will rest upon the contact-plate 31 and the catch mechanism, which has been allowed to drop by reason of the deënergizing of the magnets due to the break in the circuit occasioned by the shifting of the contact-finger 92, will engage behind the shoulder 94. The recess 90 will thereupon connect ports 81 and 82 and pressure will be admitted through the supply-port 82 into the pressure-port 81, thereby supplying pressure to the motor-diaphragm and also to the actuating-diaphragm, the exhaust-port being previously closed. The pressure against the diaphragm will thereupon cause a change in the position of the lever 67, the latter assuming the position shown in full lines in Fig. 1 of the drawings herein, such action putting a tension on spring 70 and releasing that of spring 71. The rotary valve is thereby set so that the contact-finger 92 will be shifted to the left (see Fig. 10) whenever the catch mechanism is released by means of the thermostat.

In both forms of construction the same object—namely, the automatic control of some fluid under pressure—is attained, and the only substantial difference resides in the construction of valve used. In both devices the valve-actuating mechanism is put under tension in alternate directions by the action of fluid-pressure-actuated mechanism, so as to cause the tension mechanism on one side of the valve to exert its tension thereon, while the tension mechanism on the other side is at that very moment thrown out of action or released. In the constructions shown the tension mechanism consists of the springs, one of which is always exerting tension while the other is inert; but the tension has no effect upon the valve until the latter is released by catch mechanism which is caused to operate according to some condition dependent upon the particular use to which this invention is applied.

Our device is obviously capable of governing the passage of a fluid under pressure to any fluid-pressure-actuated devices for whatever purposes used, and while our invention may be particularly useful in thermostatic systems and is described in such connection it is to be understood that it is not limited to such application or use; but, on the contrary, we contemplate using the same wherever applicable.

Although we have described more or less precise forms and details of construction, we do not intend to be understood as limiting ourselves thereto, as we contemplate changes in form, the proportion of parts, and the substitution of equivalents, as circumstances may suggest or render expedient and without departing from the spirit of our invention.

We claim—

1. A valve for controlling the passage of a fluid under pressure, in combination with two coiled springs adapted to alternately exert tension on the valve to move it in opposite directions, fluid-pressure-actuated mechanism, a fulcrumed lever connected to the ends of such springs, a rod reciprocated by said fluid-pressure-actuated mechanism and connected to the lever at one side of its fulcrum-point whereby a movement of the rod in one direction shifts the position of the lever to elongate one spring and shorten the other and vice versa.

2. A valve for controlling the passage of a fluid under pressure, in combination with two coiled springs alternately exerting tension on the valve to move it in opposite directions, a movable abutment-spring pressed in one direction, said valve admitting pressure against such abutment to move it against the tension of its spring, a lever connected at its ends to the ends of the coiled springs, and a rod reciprocated by the abutment and connected to such lever to alternately elongate one spring or the other and to shorten one or the other according to the movement or position of the rod.

3. A device for controlling pressure, comprising a valve governing ports and passages communicating respectively with the system, with the atmosphere and with a source of fluid-pressure supply, a casing also communicating with the passage to the system, a movable abutment therein, two coiled springs connected to opposite sides of the valve to move it in opposite directions when one or the other is put under tension, a lever fulcrumed on said casing and connected at its ends to the ends of the springs and a rod moved by the abutment and connected to such lever to alternately cause one or the other spring to exert tension.

4. A valve for controlling the passage of a fluid under pressure to operate thermostatically-controlled devices, in combination with two coiled springs connected at their similar ends to opposite sides of the valve, a pivoted lever connected at its ends to the other ends of the springs, a movable abutment also operated by fluid under pressure controlled by such valve, a rod reciprocated by the abutment and connected to the lever at one side of its pivotal point to distend either one of the springs and release the other whereby tension is exerted on the valve in the direction of such distended spring, catch mechanism adapted to normally hold the valve against such tension and a thermostat controlling said mechanism.

5. A valve for controlling the passage of a fluid under pressure to operate thermostatically-controlled devices and having two arms projecting from its opposite sides, coiled springs one of which is connected at one end to the outer end of each arm, a movable abutment also operated by pressure controlled by such valve, a lever connected at its ends to the other ends of such springs, a rod reciprocated by the abutment and connected to the lever to distend either one or the other of the springs according to its position, and catch mechanism normally holding the valve against the tension exerted upon it by the distended spring.

GEORGE W. FURBECK.
ALBERT N. CARVER.

Witnesses:
SAMUEL E. HIBBEN,
LOUISE E. SERAGE.